US006843603B2

(12) United States Patent
Poole et al.

(10) Patent No.: US 6,843,603 B2
(45) Date of Patent: Jan. 18, 2005

(54) REGULATOR BEARING MOUNT

(75) Inventors: Jeff Poole, Thief River Falls, MN (US); Darrel Janisch, Thief River Falls, MN (US)

(73) Assignee: Arctic Cat, Inc., Thief River Falls, MN (US)

(*) Notice: Subject to any disclaimer, the term of this patent is extended or adjusted under 35 U.S.C. 154(b) by 0 days.

(21) Appl. No.: 10/172,577

(22) Filed: Jun. 13, 2002

(65) Prior Publication Data

US 2003/0231816 A1 Dec. 18, 2003

(51) Int. Cl.[7] .............................................. F16C 32/00
(52) U.S. Cl. ...................................... 384/448; 384/624
(58) Field of Search ................................ 384/448, 624, 384/627

(56) References Cited

U.S. PATENT DOCUMENTS 5,433,525 A * 7/1995 El-Ibiary .................... 374/141
5,998,894 A * 12/1999 Raad ......................... 310/68 B
6,161,962 A * 12/2000 French et al. ............... 384/459
2002/0164099 A1 * 11/2002 Eriksson et al. ............ 384/448

* cited by examiner

Primary Examiner—Thomas R. Hannon
(74) Attorney, Agent, or Firm—Merchant & Gould P.C.

(57) ABSTRACT

A bearing mount for a vehicle such as a snowmobile. The bearing mount has a body, the body having first and second recesses. The first recess has at least one electrical device disposed therein. The electrical devices may include a voltage regulator, a speedometer sensor, and a charging circuit. The bearing mount may be filled with potting so as to encapsulate the electrical devices. The first recess may be defined by a wall. The wall may include a plurality of outwardly projecting lobes. The second recess is formed to support a bearing therein. The bearing mount may include a fill aperture, fill passage, and reservoir for holding material such as lubricant to be delivered to the second recess. The bearing mount may be sufficiently sturdy and rigid as to be mounted directly to a vehicle.

25 Claims, 5 Drawing Sheets

REGULATOR BEARING MOUNT

BACKGROUND OF THE INVENTION

This invention relates to a mount for a bearing, and more particularly to a bearing mount for a shaft in a vehicle such as a snowmobile that both supports a shaft for rotation and houses electronics.

Bearing mounts for use within vehicles are known. However, known bearing mounts perform only the function of supporting a rotating device. Conventionally, electronic devices are not housed within bearing mounts, but rather have separate housings elsewhere.

Known designs are inefficient in terms of weight and space, in that separate housings must be provided for the electronics. As many electronic devices, for example voltage regulators, require substantial amounts of metal or other materials to provide adequate heat radiation, vibration damping, etc., replication of the housings is a significant disadvantage.

In addition, known designs that utilize separate housings generally place devices some distance from the rotating components. For certain electronic devices, such as sensors used to measure the rotation of drive components, efficiency of operation decreases with distance from the rotating drive component. This is likewise disadvantageous.

SUMMARY OF THE INVENTION

Therefore it is the purpose of the present invention to overcome the deficiencies of the existing designs. It is the purpose of the present invention to provide a bearing mount with space therein for housing electrical devices.

An embodiment of a bearing mount in accordance with the principles of the present invention includes a body. The body defines a first recess therein. At least one electrical device is disposed within the first recess. The electrical devices may include but are not limited to one or more of a voltage regulator, a speedometer sensor, and a charging circuit. The body also defines a second recess therein for supporting a rotating member, such as a shaft.

In one embodiment, the bearing mount is shaped so as to have two sides, with the first recess defined in the first side and the second recess defined in the second side.

In another embodiment, the bearing mount is formed as a single, integral piece.

In another embodiment, the bearing mount is formed so as to be secured directly to a vehicle without the use of a back plate.

The body of is advantageously composed of a material with a high heat capacity and/or a high heat conductivity, so that the body serves as a heat sink for the voltage regulator.

The bearing mount may further include other devices within the second recess, including but not limited to a speedometer sensor, a charging circuit, and wiring for those or other devices.

The second recess in the bearing mount may be filled with a potting material such as epoxy.

In one embodiment, the body may define a fill aperture therein and a fill passage in communication with the fill aperture and the second recess. Material such as lubricant may be injected into the second recess through the fill aperture and the fill passage.

In one embodiment, the body may define a reservoir therein for holding fluid. The reservoir is in communication with the second recess and the fill aperture, so that material such as lubricant may be added to the reservoir and dispensed to the second recess.

It is also the purpose of the present invention to provide a method for mounting a bearing within a vehicle.

It is additionally the purpose of the present invention to provide a method for mounting electronic devices in a vehicle.

It is also the purpose of the present invention to provide a method for manufacturing a bearing mount.

It is additionally the purpose of the present invention to provide a method for installing a bearing mount in a vehicle.

BRIEF DESCRIPTION OF THE DRAWINGS

Like reference numbers generally indicate corresponding elements in the figures.

DETAILED DESCRIPTION OF THE PREFERRED EMBODIMENT

Figure 1:
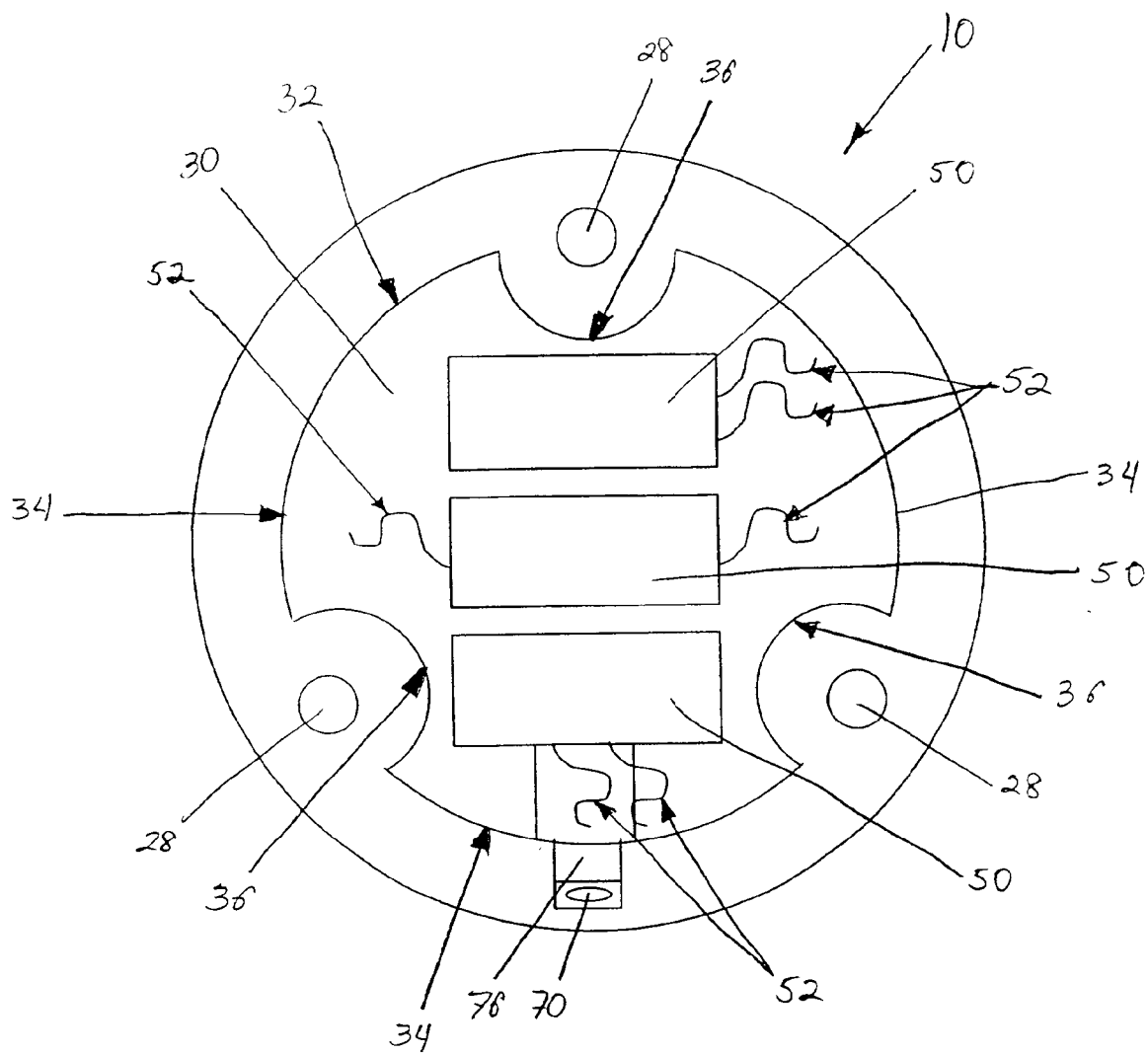
FIG. 1 is a face view of an embodiment of a bearing mount showing the first recess, with the potting omitted for clarity.

Referring to FIGS. 1–5, the present invention is directed to a bearing mount 10. The bearing mount 10 has a body 20. The body 20 defines a first recess 30 and a second recess 40 therein.

As illustrated, the body 20 is substantially in the shape of a disc, with a first side 22 and a second side 24, the first recess 30 being defined in the first side 22 and the second recess 40 being defined in the second side 24. However, it will be appreciated that this shape is exemplary only, and that a variety of other shapes may be equally suitable.

The first recess 30 is of sufficient shape and size to accept at least one electrical device 50 therein. A wide variety of electrical devices 50 may be disposed within the first recess 30.

As used in this application, the term "electrical device" includes any device that uses, measures, generates, or controls the flow of electricity. This includes but is not limited to transistorized and electronic devices and digital circuits, as well as analog systems and components thereof.

In an exemplary embodiment of a bearing mount 10 in accordance with the principles of the present invention, one of the electrical devices 50 is a voltage regulator, for controlling the electrical voltage supplied to other electrical devices. Voltage regulators are well known, and are not further described herein.

In another exemplary embodiment of a bearing mount 10 in accordance with the principles of the present invention, one of the electrical devices 50 is a speedometer sensor. The speedometer sensor may be a magnetic speedometer sensor. Magnetic speedometer sensors are known devices that determine the rotation of a shaft by detecting the motions of a magnet attached to that shaft.

Magnetic speedometer sensors are particularly suited for mounting within the bearing mount 10, as they are capable of sensing the motion of the magnet even through a substantial amount of material. Even if the body 20 partially or fully separates a magnetic speedometer sensor disposed in the first recess 30 from a rotating shaft in the second recess 40, the magnetic speedometer will nevertheless function. This is also true even if the magnetic speedometer is entirely sealed within the bearing mount 10.

In yet another exemplary embodiment of a bearing mount 10 in accordance with the principles of the present invention, one of the electrical devices 50 is a charging circuit, for controlling the charging of batteries and/or other electrical storage systems. Charging circuits are well known, and are not further described herein.

A wide variety of electrical devices 50 may be disposed within the first recess 30 of a bearing mount 10 in accordance with the principles of the present invention. The voltage regulator, speedometer sensor, and charging circuits disclosed above are exemplary only. Any or all of these three electrical devices 50 may be omitted, and other electrical devices 50 may be equally suitable.

As illustrated, the bearing mount 10 includes three electrical devices 50. However, it will be appreciated that this is exemplary only, and that it may be equally suitable to dispose either more or fewer electrical devices 50 therein.

Figure 4:
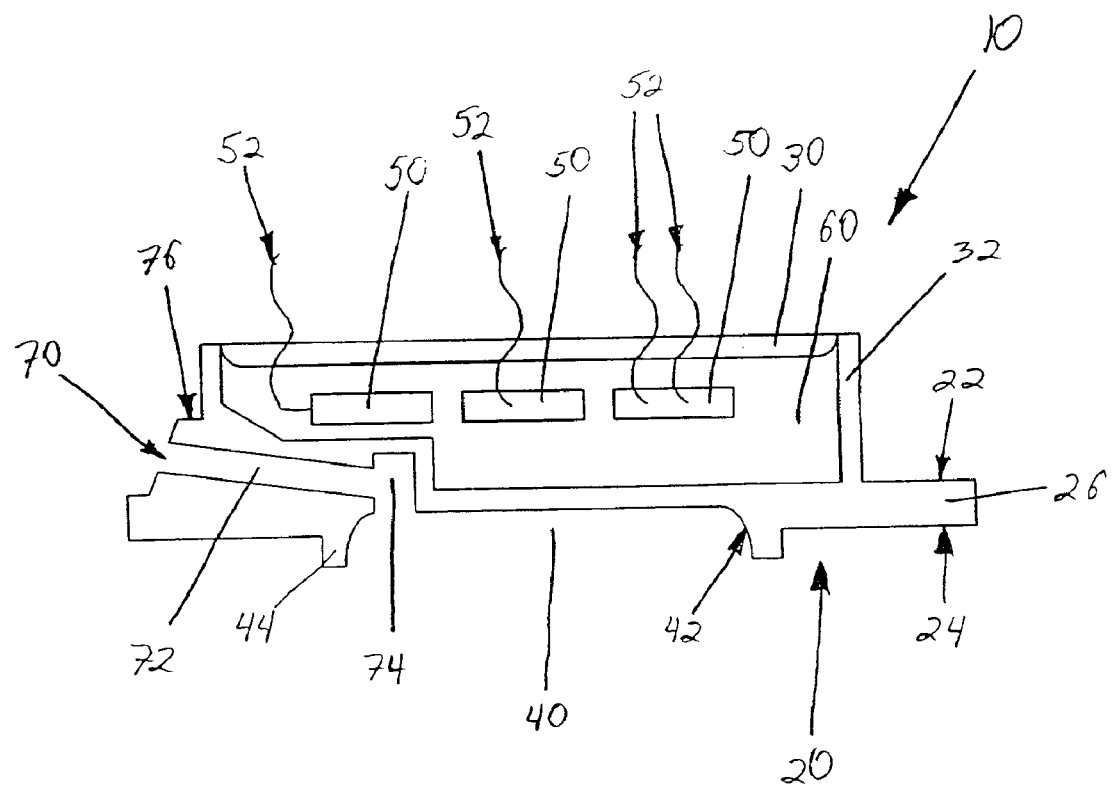
FIG. 4 is an edge cross-section of an embodiment of a bearing mount, with the mounting apertures omitted for clarity.

In addition, although the electrical devices 50 in FIGS. 1 and 4 are illustrated as separate components, this is exemplary only. Multiple electrical devices 50 may be formed as a single unit in various known manners, for example by mounting a plurality of electrical components onto a single printed circuit board. Such an arrangement may be equally suitable.

The bearing mount 10 may have one or more wires 52 disposed fully or partially within the first recess 30. Wires 52 may extend from the electrical devices 50 to or from other devices external to the bearing mount 10, such that a portion of at least some of the wires is outside of the first recess 30.

Wires 52 may also extend from one electrical device 50 to another within the first recess 30.

Although as illustrated in FIG. 4, each of the electrical devices 50 is connected to two wires 52, this is exemplary only. More or fewer wires 52 may be present, or no wires 52 at all. If more than one electrical device 50 is disposed within the first recess 30, they may have different numbers of wires 52, and some of the electrical devices 50 may have wires 52 while others do not.

Some or all of the electrical devices 50 may be secured to the body 20. For example, they may be held in place using screws, rivets, etc. Such mechanisms are well known, and are not further described herein. For purposes of clarity, no such mechanisms are illustrated in the figures. Mechanisms for securing the electrical devices 50 to the body 20 are exemplary only, and bearing mounts 10 without such mechanisms may be equally suitable.

Some or all of the electrical devices 50 may be supported in a particular position or configuration within the first recess 30. For example, the body 20 may include integrally-formed projections upon which the electrical devices 50 may rest. Alternatively, separate projections such as "stand-offs" may be added to the body 20 to support the electrical devices 50. Both integral and separate supports are well known, and are not further described herein. For purposes of clarity, no supports are illustrated in the figures.

The body 20 of the bearing mount 10 may include a wall 32 that projects from the body 20, such that the wall 32 defines the first recess 30 therein. This is advantageous, in that the wall 32 defines the first recess 30 using a relatively small amount of material, thus minimizing the total weight of the bearing mount 10.

However, such arrangement is exemplary only, and it may be equally suitable to define the first recess otherwise, without the use of a wall 32. For example, a bearing mount 10 having a body 20 that is essentially solid, with the first recess 30 set therein, may be equally suitable.

In embodiments that include a wall 32, the wall 32 may be shaped to include one or more lobes 34. The wall may also have indentations 36 between adjacent lobes. This is advantageous, in that a wall 32 with lobes 34 and indentations 36 typically is more rigid than a similar wall 32 without lobes 34 and indentations 36. However, such a structure is exemplary only, and walls 32 without lobes 34 and indentations 36 may be equally suitable.

Figure 5:
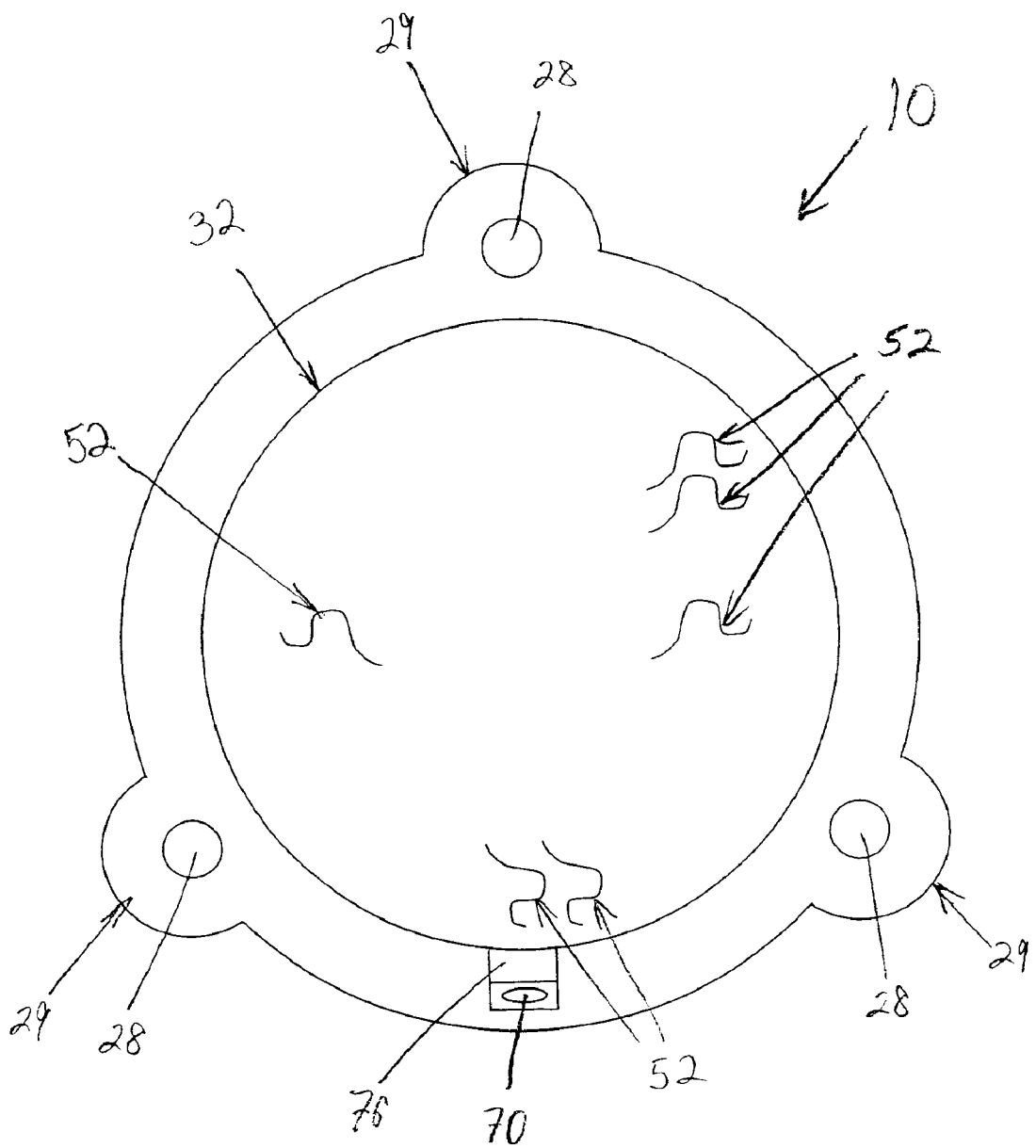
FIG. 5 is a face view of another embodiment of a bearing mount showing the first recess, with outward projecting lobes.

As illustrated in FIGS. 1–3 and 5, the wall 32 is generally circular in shape) with three lobes 34 and three indentations 36. However, this shape is exemplary only. Other shapes, including but not limited to ovals, squares, and triangles, may be equally suitable. Likewise, a different number of lobes 34 and indentations 36, or no lobes 34 and indentations 36, may be equally suitable. FIG. 5 illustrates an embodiment in accordance with the principles of the claimed invention that wherein the wall 32 is a complete circle, without lobes 34 or indentations 36.

The first recess 30 may be at least partially filled with potting 60. The potting 60 may fully or partially encapsulate one or more of the electrical devices 50. In a preferred embodiment, the first recess 30 is filled with potting 60 to at least the point that the electrical devices 50 are fully encapsulated and sealed thereby.

It is not necessary for the potting 60 to be free of voids, although for certain applications it may be advantageous to at least minimize the presence of voids if possible.

Filling the first recess 30 with potting 60 helps protect the electrical devices 50 from environmental damage due to rain, dust, debris, etc.

In addition, potting 60 helps hold the electrical devices 50 in place, thus preventing them from coming loose and protecting them from vibrations.

Furthermore, surrounding or partially surrounding the electrical devices 50 with potting 60 helps to distribute and dissipate heat generated by the electrical devices 50, thereby reducing the risk of damage to both the electrical devices 50 and any other heat-sensitive components that may be nearby.

A variety of materials may be suitable for use as potting 60. Epoxy resins are particularly suitable due to their high durability and heat resistance. However, epoxy is exemplary only, and other materials may be equally suitable. Suitable potting 60 materials may also include, but are not limited to, urethane, silicone, and other resins and elastomers.

The potting 60 may include several materials in combination. For example, the potting 60 may include a resin such as epoxy with one or more filler materials such as glass mixed therewith.

Alternatively, the potting 60 may include different materials at different portions thereof. For example, the potting 60 may include a base material encapsulating the electrical devices 50, with a layer of a different material applied over the first material.

As may be seen in FIG. 4, if wires 52 are present within the first recess 30, they may extend beyond the potting 60.

As previously noted, the body 20 of a bearing mount 10 in accordance with the principles of the present invention defines a second recess 40 therein. The second recess 40 is shaped and sized to receive a bearing therein.

Figure 2:
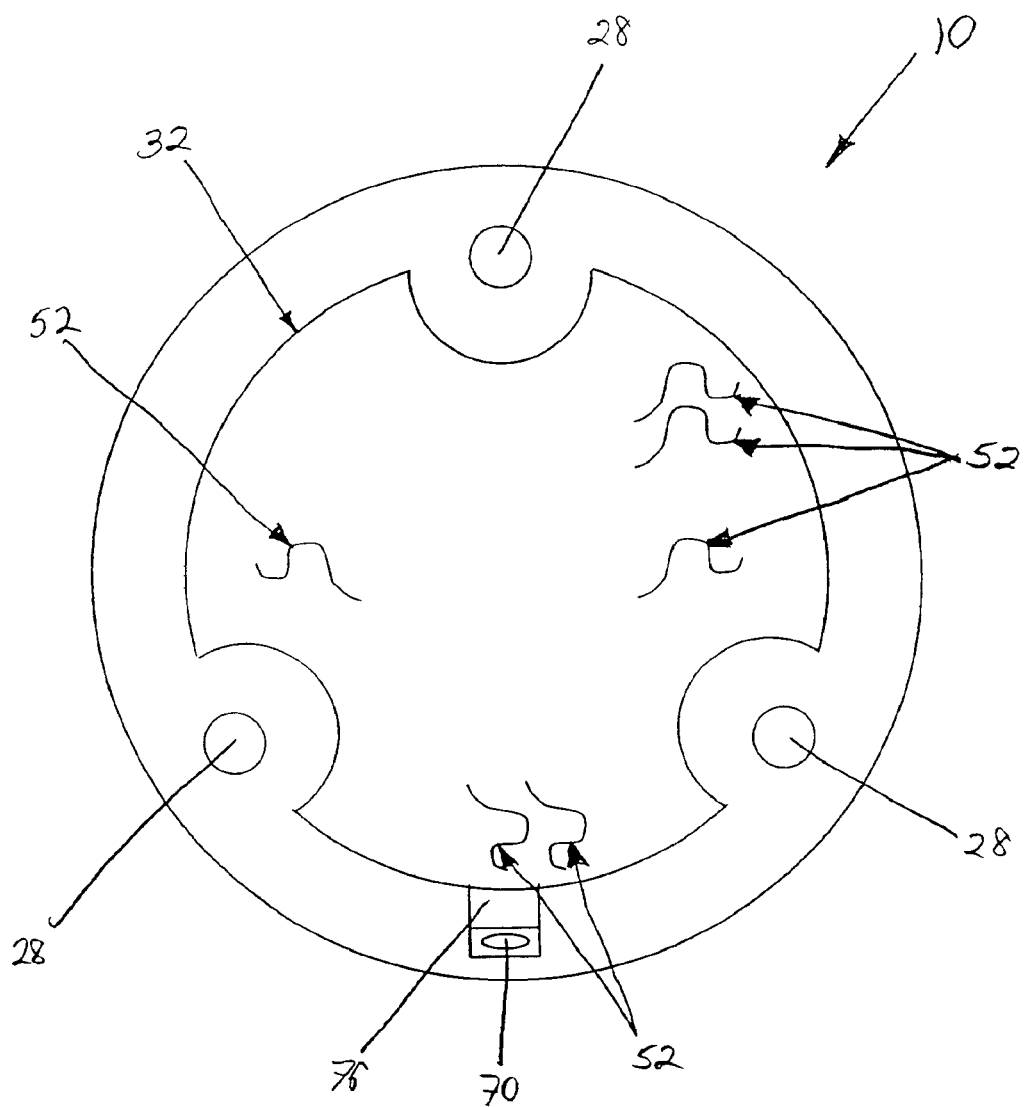
FIG. 2 is a face view of an embodiment of a bearing mount showing the first recess with potting.
Figure 3:
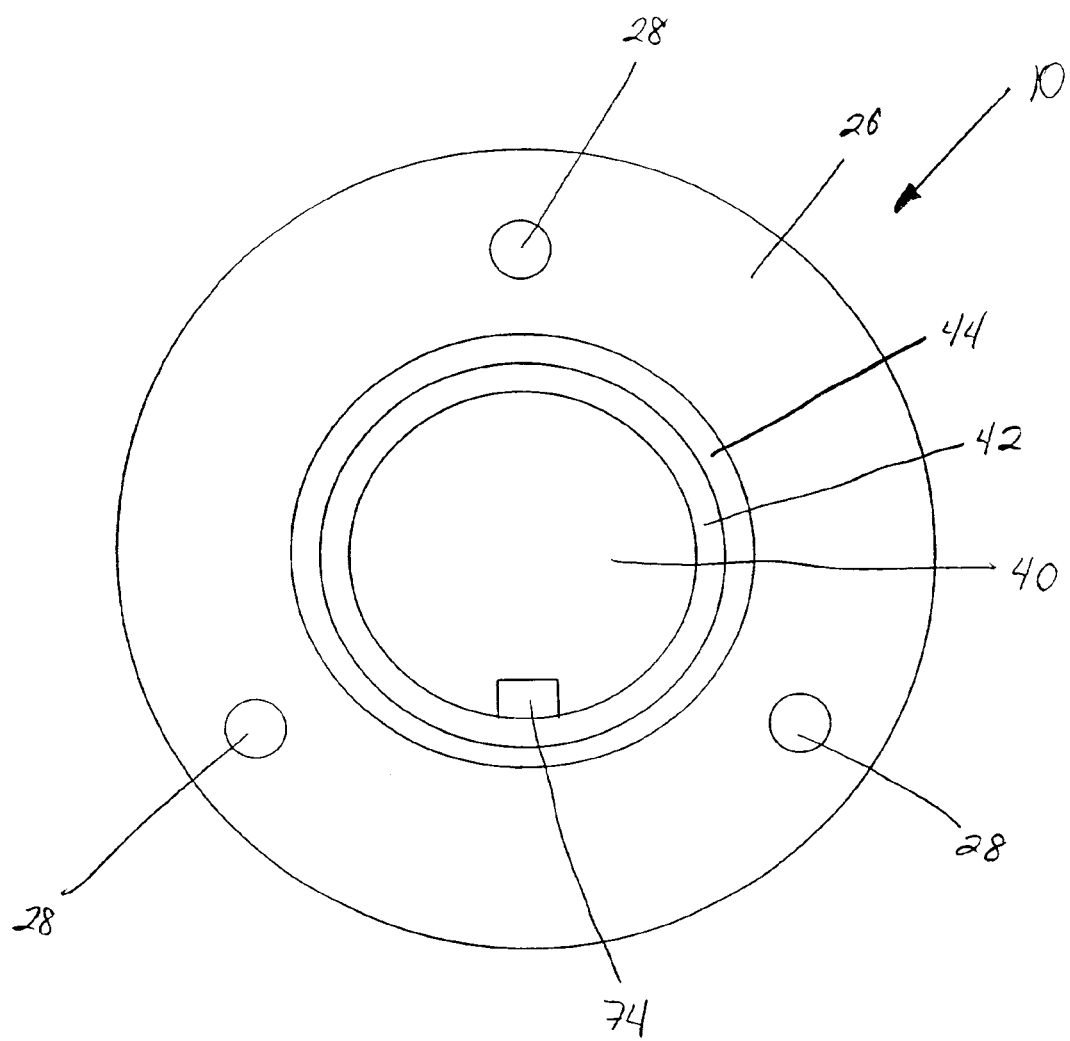
FIG. 3 is a face view of an embodiment of a bearing mount showing the second recess.

The second recess 40 may be formed in a variety of shapes and sizes, depending on the particular application, i.e. what sort of bearing the bearing mount 10 must support. As illustrated in FIG. 2, the second recess 40 is shaped to receive a bearing for a rotating shaft of the sort used for a track shaft or a driven shaft in a vehicle such as a snowmobile. However, this is exemplary only, and the second recess 40 may be configured to receive a variety of other bearings.

The second recess 40 may have an inner rim 42, so as to provide additional support for a bearing mounted within the second recess 40.

The inner rim 42 may have the shape of a spherical segment. Such an exemplary embodiment may be seen in FIG. 4, wherein the inner rim 42 has the shape of a "slice" of a sphere with a diameter slightly greater than that of the second recess 40. Such a shape provides particularly good support for a bearing mounted within the second recess 40. However, this shape is exemplary only, and other shapes may be equally suitable.

The body 20 of the bearing mount 10 may include a lip 44 projecting from the body 20 peripheral to the second recess 40. The lip 44 acts to increase the effective depth of the second recess 40 without making it necessary to increase the thickness of the body 20 itself. Thus, the lip 44 may also be considered to increase the height of the rim 42.

The presence of a lip 44 may be advantageous for certain applications by creating a relatively broad rim 42 while keeping the total weight of the bearing mount 10 low. However, a lip 44 is exemplary only, and it may be omitted.

The bearing mount 10 may include a fill aperture 70 for receiving material introduced therein. The fill aperture 70 is connected to a fill passage 72, which in turn connects with the second recess 40. Thus, the fill aperture 70, fill passage 72, and second recess 40 are in fluid communication, such that fluid flow therebetween is enabled. Fluid introduced into the fill aperture 70 flows into the fill passage 72, and then into the second recess 40.

With such an arrangement, fluids may be added to the bearing without the need for removing the bearing from the bearing mount 10. For example, lubricants may be periodically added in order to promote smooth operation of the bearing. However, fluids other than lubricants may also be added, including but not limited to cleaning agents, dyes for leak detection, etc.

As used in this application, the term "fluid" includes any material that may be made to flow from the fill aperture 70, through the fill passage 72, and into the second recess 40. Fluids in particular are not limited to liquids only. Materials such as viscous greases are also considered fluids herein, even those which might require pressurized injection in order to reach the second recess 40. Likewise, flowable powders or granules such as graphite are also considered fluids herein.

Although the fill passage 72 is in communication with the second recess 40, the fill aperture 70 need not be defined proximate the second recess 40. Indeed, as the second recess 40 is typically inconvenient or impossible to access with a bearing mounted therein, it may be advantageous for the fill aperture 70 to be defined distal to the second recess 40.

For example, in the embodiment illustrated in FIGS. 1, 2, and 4, even though the second recess 40 is on the second side 24 of the body 20, the fill aperture 70 is proximate the first recess 30 on the first side 22 of the body 20. However, this arrangement is exemplary only, and it may be equally suitable to define the fill aperture 70 in other locations, including but not limited to locations proximate the second recess 40.

The bearing mount 10 may also include a reservoir 74 defined by the housing 20. The reservoir is in fluid communication with the second recess 40 and with the fill aperture 70, such that fluid flow therebetween is enabled. Fluid introduced into the fill aperture 70 flows into the reservoir 74, and then into the second recess 40.

The reservoir 74 holds a quantity of fluid, so that fluid may be distributed to the second recess 40 over a period of time. For example, the reservoir 74 may be filled with a lubricant, to increase the amount of time that a bearing mounted in the bearing mount 10 may operate without maintenance.

As illustrated in FIG. 4, the reservoir 74 is a rectangular recess. However, this shape is exemplary only, and a variety of other configurations may be equally suitable.

Likewise, in the embodiment shown in FIG. 4, the reservoir 74 is at the end of the fill passage 72 where it opens into the second recess 40, and so is immediately adjacent to the second recess 40.

However, this arrangement is exemplary only. The reservoir 74 may be defined at the opposite end of the fill passage 72, proximate the fill aperture 70. Alternatively, the reservoir 74 may be defined partway along the fill passage 72, rather than at one end or another. Furthermore, the presence of the reservoir is itself exemplary, and in some embodiments it may be suitable to omit it entirely.

In some embodiments, the body 20 may include a boss 76 with the fill aperture 70 defined therein. This provides additional reinforcement in the vicinity of the fill aperture 70, and also provides a visual and tactile indication of the location of the fill aperture 70 so that it may be easily found when introducing fluid therein. An exemplary illustration of a boss 76 is shown in FIGS. 1, 2, and 4. However, the boss 76 as illustrated is exemplary only, and other shapes, sizes, and locations of boss 76, or no boss 76 at all, may be equally suitable.

The body 20 may have a base 26. In some embodiments, the base 26 is sufficiently durable, and the bearing mount 10 is sufficiently rigid, that the bearing mount 10 may be affixed directly to a vehicle without the need for a separate back plate. Conventionally, back plates are required when mounting a bearing mount to a vehicle. The ability to secure the bearing mount 10 directly to the vehicle makes assembly and maintenance simpler and reduces the total number of parts in the vehicle.

However, this configuration is exemplary only. In certain embodiments, it may be equally suitable for the body 20 to have a base 26 that that requires two or more additional plates, or for the body 20 to have no base 26 at all. Likewise, in certain embodiments, the bearing mount 10 may be affixed to a vehicle without a back plate.

In addition, the body 20 may be of unitary, integral construction. This is advantageous in terms of manufacturing, as it reduces the number of steps. It is also advantageous in terms of reliability, as fewer parts are present and hence there are fewer modes of failure. However, this is exemplary only, and a body 20 having two or more pieces may be equally suitable.

The bearing mount 10 may define mounting apertures 28 therethrough. The mounting apertures facilitate the attachment of the bearing mount 10 to the vehicle using conventional mechanisms including but not limited to nuts and bolts. Such mechanisms are well known, and are not described further herein.

As illustrated, the bearing mount 10 defines three mounting apertures 28 through the base 26 of the body 20. However, this is exemplary only. Different locations and different numbers of mounting apertures 28 may be equally suitable. Furthermore the mounting apertures 28 may be omitted entirely, as alternative mechanisms for securing the bearing mount 10 to a vehicle, including but not limited to clamps, may be equally suitable.

In particular, the mounting apertures 28 may be located either inboard or outboard of the perimeter of the first recess 30.

FIGS. 1–4 show embodiments with mounting apertures 28 inboard from the perimeter of the first recess 30. In the configuration shown, they mounting apertures 28 are accommodated by the lobes 34 and in the wall 32.

FIG. 5 shows an alternative embodiment with mounting apertures 28 located outboard of the perimeter of the first recess 30. As shown in FIG. 5, the bearing mount 10 may include projections 29 with the apertures 28 defined therethrough. However, projections 29 are not required, and apertures 28 may also be defined through the bearing mount 10 elsewhere than at projections 29 even in embodiments wherein projections 29 are present.

The embodiments shown and described are exemplary only. A variety of other arrangements of mounting apertures 28 may be equally suitable.

The body 20 may be made of any material that is sufficiently durable and heat-resistant. Advantageously, the body 20 may be made of materials that have a high heat conductivity and/or a high heat capacity. Such materials may act as a heat sink, facilitating the dissipation of heat and resisting the development of localized hot spots.

Metals are particularly suitable for the body 20. In particular, steel is an excellent material for use as a body 20. However, a variety of other materials may be equally suitable, including but not limited to other metals, and ceramics.

The present invention is also a method for manufacturing a bearing mount 10 as described and illustrated herein. The method includes the step of forming a body 20 for a bearing mount 10, with a first recess 30 and a second recess 40 defined in the body 20. At least one electrical device 50 is disposed within the first recess 30.

The method may include the step of at least partially filling the first recess 30 with potting 60 after the at least one electrical device 50 is disposed therein.

The present invention is additionally a method for mounting at least one electrical device 50 in a vehicle. The method includes the step of forming a body 20 for a bearing mount 10, with a first recess 30 and a second recess 40 defined in the body 20. At least one electrical device 50 is disposed within the first recess 30. The bearing mount 10 is attached to the vehicle.

The method may include the step of at least partially filling the first recess 30 with potting 60 after the at least one electrical device 50 is disposed therein.

The present invention is furthermore a method for attaching a bearing mount 10 to a vehicle. The method includes the step of forming a body 20 for a bearing mount 10, with a first recess 30 and a second recess 40 defined in the body 20. At least one electrical device 50 is disposed within the first recess 30. The bearing mount 10 is attached directly to the vehicle, such that the second recess 40 is oriented and positioned to receive a bearing therein.

The method may include the step of at least partially filling the first recess 30 with potting 60 after the at least one electrical device 50 is disposed therein.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A bearing mount for a vehicle, comprising:

a body having first and second opposing sides;

a first recess defined in said first side of said body;

at least one electrical device disposed in said first recess; and a second recess defined in said second side of said body for supporting a rotating member, the second recess having an axis of symmetry that is coaxial with an axis of rotation of the rotating member;

wherein the axis of symmetry of the second recess extends towards the first recess.

2. A bearing mount as in claim 1, wherein:

said at least one electrical device comprises a voltage regulator.

3. A bearing mount as in claim 1, wherein:

said at least one electrical device comprises a speedometer sensor.

4. A bearing mount as in claim 3, wherein:

said speedometer sensor is a magnetic speedometer sensor for detecting a magnet attached to the rotating member.

5. A bearing mount as in claim 1, wherein:

said at least one electrical device comprises a charging circuit.

6. A bearing mount as in claim 1, further comprising:

at least one wire, at least a portion of said at least one wire being disposed in the first recess.

7. A bearing mount as in claim 1, wherein:

said first recess is at least partially filled with potting.

8. A bearing mount as in claim 7, wherein:

said first recess is sufficiently filled with said potting such that said at least one electrical device is encapsulated by said potting.

9. A bearing mount as in claim 7, wherein:

said potting comprises epoxy.

10. A bearing mount as in claim 1, wherein:

said body comprises first and second sides, said first recess being on said first side, and said second recess being on said second side.

11. A bearing mount as in claim 1, wherein:

said body comprises a wall defining said first recess therein.

12. A bearing mount as in claim 11, wherein:

said wall comprises a plurality of outwardly projecting lobes.

13. A bearing mount as in claim 12, wherein:

said wall comprises three outwardly projecting lobes.

14. A bearing mount as in claim 1, wherein:

said body comprises a rim peripheral to said second recess.

15. A bearing mount as in claim 14, wherein:
an inner surface of said rim is in the shape of a spherical segment.

16. A bearing mount as in claim 1, wherein:
said body defines a fill aperture therein; and
said body defines a fill passage in communication with said fill aperture and said second recess, such that flow from said fill aperture to said second recess is enabled.

17. A bearing mount as in claim 16, wherein:
said body comprises a boss thereon, said fill aperture being defined in said boss.

18. A bearing mount as in claim 16, wherein:
said body defines a reservoir, said reservoir being in fluid communication with said second recess and said intake aperture, such that fluid flow from said intake aperture to said reservoir and from said reservoir to said second recess is enabled.

19. A bearing mount as in claim 1, wherein:
said body is an integral, one-piece unit.

20. A bearing mount as in claim 1, wherein:
said body is adapted to be secured without a back plate to a vehicle.

21. A bearing mount as in claim 1, wherein:
said body defines at least one mounting aperture therein.

22. A bearing mount for a vehicle, comprising:
a body;
a first recess defined in said body;
at least one electrical, device disposed in said first recess; and
a second recess defined in said body for supporting a rotating member;
wherein said body defines a fill aperture and a fill passage in communication with said fill aperture and said second recess, such that flow from said fill aperture to said second recess is enabled.

23. A bearing mount as in claim 22, wherein:
said body comprises a boss thereon, said fill aperture being defined in said boss.

24. A bearing mount as in claim 22, wherein:
said body defines a reservoir, said reservoir being in fluid communication with said second recess and said intake aperture, such that fluid flow from said intake aperture to said reservoir and from said reservoir to said second recess is enabled.

25. A bearing mount for a vehicle, comprising:
a body;
a first recess defined in said body;
at least one electrical device disposed in said first recess; and
a second recess defined in said body for supporting a rotating member;
wherein said body comprises a run peripheral to said second recess, and an inner surface of said rim is in the shape of a spherical segment.

* * * * *

UNITED STATES PATENT AND TRADEMARK OFFICE
CERTIFICATE OF CORRECTION

PATENT NO. : 6,843,603 B2
DATED : January 18, 2005
INVENTOR(S) : Poole et al.

It is certified that error appears in the above-identified patent and that said Letters Patent is hereby corrected as shown below:

Column 9,
Line 30, "at least one elecrical, device" should read -- at least one electrical device --

Column 10,
Line 27, "comprises a run peripheral to said" should read -- comprises a rim peripheral to said --

Signed and Sealed this

Seventh Day of June, 2005

JON W. DUDAS
*Director of the United States Patent and Trademark Office*